(12) United States Patent
Corn et al.

(10) Patent No.: US 9,009,844 B1
(45) Date of Patent: *Apr. 14, 2015

(54) METHODS AND APPARATUS FOR KNOWLEDGE-BASED AUTHENTICATION USING HISTORICALLY-AWARE QUESTIONNAIRES

(75) Inventors: Thomas S. Corn, Newton, MA (US); Ari Juels, Brookline, MA (US); Nikolaos Triandopoulos, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/436,080

(22) Filed: Mar. 30, 2012

(51) Int. Cl.
H04L 29/06 (2006.01)

(52) U.S. Cl.
CPC ................ *H04L 19/06755* (2013.01)

(58) Field of Classification Search
USPC ........................................ 726/2, 27
See application file for complete search history.

(56) References Cited

U.S. PATENT DOCUMENTS

| | | | |
|---|---|---|---|
| 7,389,275 B2* | 6/2008 | Kemper et al. ............ | 705/64 |
| 8,424,061 B2* | 4/2013 | Rosenoer ................ | 726/4 |
| 2003/0158815 A1 | 8/2003 | Yashida et al. | |
| 2003/0200137 A1* | 10/2003 | Drummond ............. | 705/12 |
| 2005/0039057 A1* | 2/2005 | Bagga et al. ............ | 713/202 |
| 2006/0020501 A1 | 1/2006 | Leicht et al. | |
| 2008/0005037 A1* | 1/2008 | Hammad et al. ......... | 705/67 |
| 2008/0319869 A1* | 12/2008 | Carlson et al. .......... | 705/26 |
| 2010/0082612 A1* | 4/2010 | Duan et al. ............. | 707/724 |
| 2010/0205652 A1 | 8/2010 | Bouchard et al. | |
| 2013/0263230 A1* | 10/2013 | Gorodyansky et al. ..... | 726/4 |

OTHER PUBLICATIONS

Chokhani, Santosh, "Knowledge Based Authentication (KBA) Metrics", Feb. 2004, Orion.*
U.S. Appl. No. 13/249,957, filed Sep. 30, 2011, entitled "Methods and Apparatus for Secure and Reliable Transmission of Messages Over a Silent Alarm Channel."
Ali et al, Enhanced Knowledge Based Authentication Using Iterative Session Parameters, World Academy of Science, Engineering and Technology, pp. 293-299, 2010.
Rabkin, Personal Knowledge Questions for Fallback Authentication: Security Questions in the Era of Facebook, Symposium on Usable Privacy and Security (SOUPS) 2008, Jul. 23-25, 2008, pp. 1-11.

* cited by examiner

*Primary Examiner* — Mohammad L Rahman
(74) *Attorney, Agent, or Firm* — Ryan, Mason & Lewis, LLP (57) ABSTRACT

Knowledge-based authentication (KBA) is provided using historically-aware questionnaires. The KBA can obtain a plurality of historically different answers from the user to at least one question; challenge the user with the question for a given period of time; receive a response from the user to the question; and grant access to the restricted resource if the response is accurate for the given period of time based on the historically different answers. Alternatively, the KBA can be based on historically aware answers to a set of inter-related questions. The user is challenged with the inter-related questions for a given period of time. Historically different answers can comprise answers with applicable dates, or correct answers to the question over time. Historically aware answers can comprise an answer that is accurate for an indicated date or period of time. An accurate response demonstrates knowledge of multiple related personal events.

41 Claims, 5 Drawing Sheets

METHODS AND APPARATUS FOR KNOWLEDGE-BASED AUTHENTICATION USING HISTORICALLY-AWARE QUESTIONNAIRES

CROSS-REFERENCE TO RELATED APPLICATION

The present application is related to U.S. patent application Ser. No. 13/436,125, entitled "Methods and Apparatus for Fraud Detection and Remediation in Knowledge-Based Authentication," filed contemporaneously herewith and incorporated by reference herein.

FIELD OF THE INVENTION

The present invention relates generally to the field of user authentication, and more particularly to authentication techniques that permit a user to authenticate to a protected resource, such as a web site or some type of processing device.

BACKGROUND OF THE INVENTION

Knowledge-based authentication (KBA) refers to a user-authentication process that seeks to verify the identity of an individual accessing a protected resource, such as a web site, using secret information to establish trust between the individual and a server. KBA requires the knowledge of personal information of the individual to grant access to the protected resource.

Existing KBA processes generally rely on the following underlying axiom: Demonstrating knowledge of some personal information, typically shared among the user and the server, is equivalent to proving the user's identity to the server. KBA is often used for sensitive status updates (e.g., password resets, personal record updates or banking information updates), where the user is required to provide the answer to one or more personal questions. The answers are generally considered to be easy to remember by the user but unknown by others.

Static KBA is based on a set of previously shared secrets, and challenges the user to provide the server with some secret (to the general public) user-specific information that has been previously shared between the user and the server during a set-up phase. Dynamic KBA is based on questions generated from a wider base of personal information. Dynamic KBA is generally considered an "on-the-fly" generation of personal information by the server based on, for example, the user's record, account and/or profile. For dynamic KBA, the user does not know in advance the question (challenge) that will be asked by the server.

While KBA offers a valuable authentication mechanism, KBA suffers from a number of limitations related to the prediction or discovering power of an attacker, which if overcome, could further improve the security and utility of KBA. For example, to allow the users to easily recall and correctly provide the answers to the questions that they are challenged with, KBA typically uses secrets that come from sets that do not have high entropy. Thus, KBA secrets are often easy to remember, and are often also easy to guess. For instance, the search space for guessing a randomly selected password comprised of eight case-sensitive characters, numbers or symbols is of a size of at least $64^8$ ($=2^{48}$) whereas the search space for guessing the birth city of an individual corresponds to the number of cities in the world, i.e., 248,752($<2^{18}$) (according to the 2007 Getty Thesaurus of Geographic names). KBA is thus often only used as an auxiliary means of authentication (e.g., in combination with high-entropy passwords).

KBA is vulnerable to brute-force or dictionary attacks, i.e., an exhaustive search through the small search space of the answers of a given question. In this case, the attacker has no information about the secret, other than that it comes from a fixed, well-defined universe (of relatively small size). In practice, dictionary attacks can search in even smaller search spaces if some background information is given about the victim user.

In addition, with the advent of the Internet, the plethora of Web data and the growth of social networking, the dividing line between what constitutes personal secret information and what may be personal but "guessable or discoverable" information is no longer clear. For instance, a person's mother's maiden name may be easy to obtain through social engineering methods. Furthermore, an attacker may attempt sophisticated data-mining attacks against a victim user's personal data from large volumes of general data that becomes legitimately available to the public or to selected communities. For example, a data mining effort over public records for a significant percentage of a targeted population of Texas residents also revealed mothers' maiden names.

Therefore, such attacks raise a big challenge for KBA authentication. A need therefore exists for techniques for preventing fraud related to KBA. Yet another need exists for improved KBA authentication techniques that permit the detection and remediation of fraud.

SUMMARY OF THE INVENTION

Generally, methods and apparatus are provided for knowledge-based authentication using historically-aware questionnaires. According to one aspect of the invention, knowledge-based authentication is performed by a server for restricting access of a user to a restricted resource. The exemplary knowledge-based authentication comprises obtaining a plurality of historically different answers from the user to at least one question; challenging the user with the question for a given period of time; receiving a response from the user to the question; and granting access to the restricted resource if the response is accurate for the given period of time based on the historically different answers.

The historically different answers can comprise answers with applicable dates, or a series of correct answers to the question over time. For example, the historically different answers comprise a series over time of one or more of facts, traits and characteristics of the user. A confidence score can be determined based on the assessment of the response and the historically different answers. The confidence score can assess a credibility of the user and optionally be evaluated relative to a threshold. A fraud remediation method can be optionally be implemented when the confidence score is within a predefined tolerance of the threshold.

According to another aspect of the invention, the exemplary knowledge-based authentication can comprise obtaining a plurality of historically aware answers from the user to a set of inter-related questions; challenging the user with one or more of the inter-related questions for a given period of time; receiving a response from the user to the one or more inter-related questions; and granting access to the restricted resource if the response is accurate for the given period of time based on the historically aware answers. The historically aware answers can comprise, for example, an answer to a given question that is accurate for an indicated date or period of time.

A confidence score can be determined based on the assessment of the response and the historically different answers. The confidence score assesses, for example, a credibility of the user. The confidence score can be evaluated relative to a threshold. A fraud remediation method can be implemented when the confidence score is within a predefined tolerance of the threshold.

An accurate response demonstrates with measurable confidence that the user has global knowledge of multiple related events.

The authentication and communication techniques of the illustrative embodiments overcome one or more of the problems associated with the conventional techniques described previously, and permit users to authenticate themselves using silent-alarm knowledge based authentication. Moreover, no modification of the applications or communication protocols is required. These and other features and advantages of the present invention will become more readily apparent from the accompanying drawings and the following detailed description.

DETAILED DESCRIPTION

The present invention provides methods and apparatus for fraud detection and remediation in knowledge-based authentication systems. The disclosed methods allow the server to gather evidence about impersonation attempts performed by an attacker. Using user-specific behavioral, historical or contextual meta-data information, the disclosed exemplary fraud-detection methods exploit an informational gap that exists between the knowledge set of the legitimate user and that of a malicious impersonator.

According to one aspect of the invention, KBA authentication is augmented with an additional level of communication, referred to as a silent alarm alert, between the user and the server to indicate the credibility of the user. As discussed hereinafter, this communication is indirect, i.e., it is embedded in the primitive communication between the user and the server (i.e., embedded in the communication normally performed between the user and the server to provide the shared secret information, e.g., by providing an answer with some personal information). This added level of communication can be considered a silent alarm, i.e., a special-purpose undetectable alert message that provides an additional indication about the "credibility" (or lack thereof) of the user.

The disclosed exemplary fraud-detection methods enable the triggering of a "silent alarm" whenever it is determined that fraudulent authentication is performed; this alarm carries a score signal and the stronger the score signal the higher the confidence about the fraudulent attempt. Depending on the strength of this score signal, the server decides on an appropriate remediation strategy. A number of exemplary fraud remediation methods are discussed further below in conjunction with FIG. 8 that allow the authentication server to respond to attempted impersonation attacks in an effective way with respect to aspects such as user data protection, intrusion evidence construction, impersonator identification and data-leak source discovery.

U.S. patent application Ser. No. 13/249,957, filed Sep. 30, 2011, entitled "Methods and Apparatus for Secure and Reliable Transmission of Messages Over a Silent Alarm Channel," (now U.S. Pat. No. 8,788,817), incorporated by reference herein, discloses silent alarm channels that are cryptographically protected channels between potentially compromised devices and a trustworthy log-collection point or server. A silent alarm implements a cryptographic channel between a sender and a receiver through which messages are transmitted: (1) securely (i.e., the alarm is unreadable and unchangeable), (2) undetectably (i.e., the alarm is silent), and (3) persistently (i.e., the alarm cannot be turned off). The alert messages can serve as a differentiating feature that allows the server to decide if the communicating party is the true user or an attacker trying to impersonate the true user.

It is noted that the silent alarms employed by the present invention need not incorporate the cryptographic aspects of the silent alarms disclosed in U.S. patent application Ser. No. 13/249,957.

According to a further aspect of the present invention, the main authentication dimension of the disclosed KBA techniques remains the knowledge of a secret. The additional silent alarm aspect, however, allows the server to operate with "surrounding" information that can be used to identify fraudulent authentication attempts.

Silent-alarm knowledge-based authentication (or SA-KBA for short) is based on a new postulate around what constitutes truly personal knowledge. SA-KBA is not only about knowing facts, but also about knowing the complete history, interrelation, and contextual meta data of facts. The disclosed SA-KBA techniques ask a user to demonstrate knowledge of the meaning, temporal interconnection, and content correlation of some predefined, user-server shared personal information to prove the user's identity to the server.

The disclosed framework for fraud-detection in KBA authentication involves a set-up phase and a challenge phase. An exemplary silent-alarm knowledge-based authentication system 900 is discussed further below in conjunction with FIG. 9.

Figure 1:
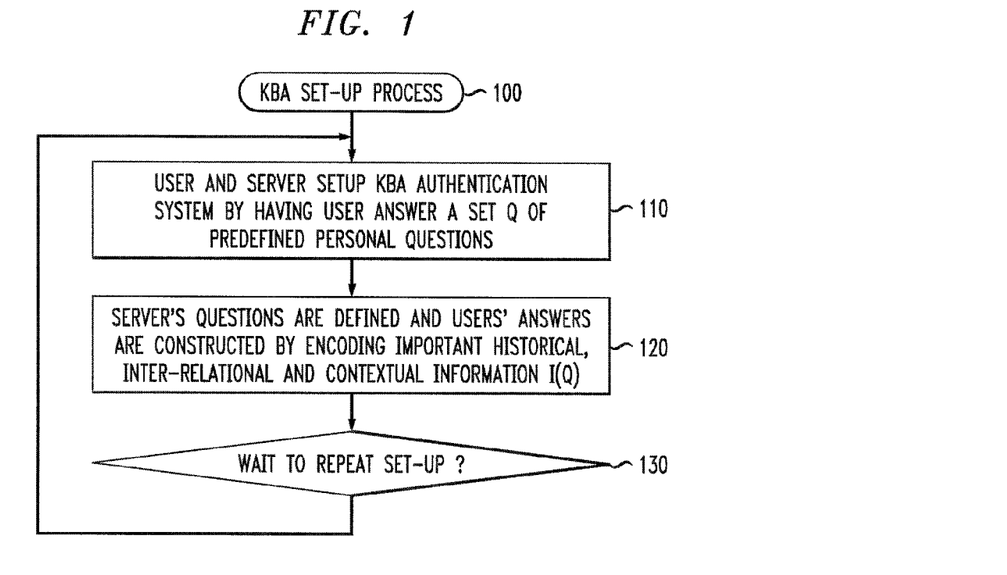
FIG. 1 is a flow chart describing an exemplary KBA set-up process incorporating aspects of the present invention.

FIG. 1 is a flow chart describing an exemplary KBA set-up process 100 incorporating aspects of the present invention. As shown in FIG. 1, the exemplary KBA set-up process 100 initially sets up the KBA authentication system during step 110 by having the user communicating with the server, where the user answers a set Q of personal questions. The questions in Q can be predefined or generated on-the-fly during this communication step. The set Q of server's questions is defined and the corresponding set A of user's answers is constructed during step 120 by encoding important historical, inter-relational and contextual information I(Q). The server stores Q, A and I(Q) The setup phase can optionally, periodically or on-demand, be repeated during step 130, where the set Q of personal questions, their corresponding answers A and the encoded historical, inter-relational and contextual information I(Q) is optionally updated or augmented. In any such setup phase the user is authenticated through some strong form of authentication.

Figure 2:
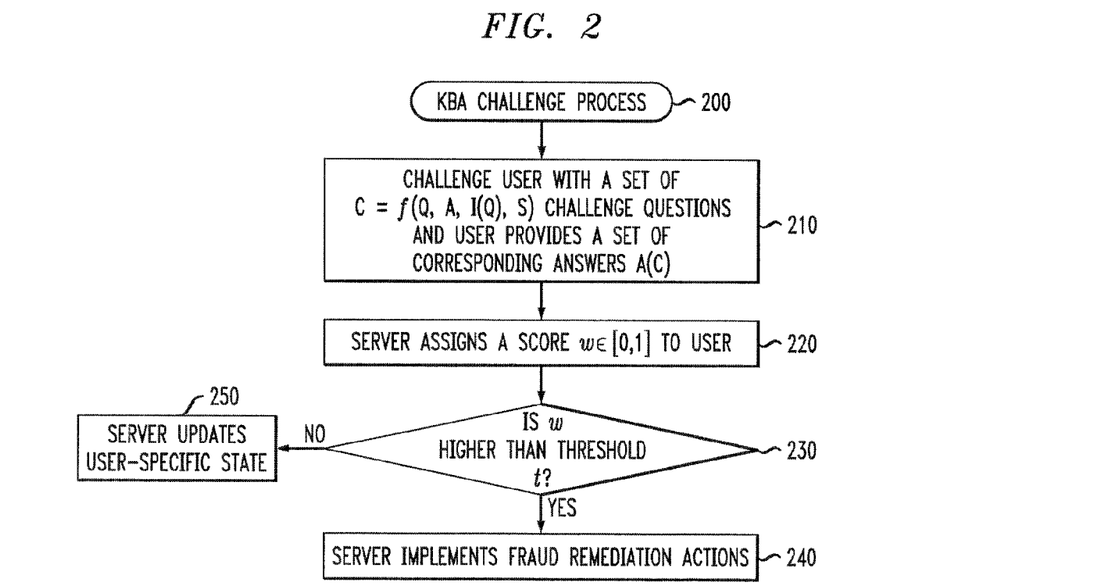
FIG. 2 is a flow chart describing an exemplary KBA challenge process incorporating aspects of the present invention.

FIG. 2 is a flow chart describing an exemplary KBA challenge process 200 incorporating aspects of the present invention. As shown in FIG. 2, during step 210, the user is initially challenged with a set of C=f(Q,A,I(Q),S) challenge questions, where f is some (possibly probabilistic) function applied on the initial set of questions Q, their corresponding answers A, the contextual information I(Q) and some additional state information S. For example, in the simplest case, f defines a random subset C of Q. Then, the user provides a set of corresponding answers, A (C). According to one aspect of the invention, an indirect silent alarm is embedded in the answers provided by the user.

During step 220, the server processes $\{Q, A, I(Q), C, A(C), S\}$, by applying some (possibly probabilistic) function g, and assigns a score $w \in [0,1]$ to the authentication attempt of the user. The score w corresponds to the strength of the silent-alarm signal and is defined, for example, such that the closer the score is to 1 (on a scale of 0 to 1), the more likely it is that the user has been impersonated.

A test is performed during step 230, to determine if w is higher than a predetermined or dynamically resettable user-specific threshold value t. If it is determined during step 230 that w is higher than the threshold value t, then the server proceeds with some well-defined fraud-detection or fraud-remediation actions during step 240, as discussed further below. If, however, it is determined during step 230 that w is not higher than the threshold value t, then the server updates the user-specific state $\{t, Q, A, I(Q), S\}$ by applying some (possible probabilistic) function h on $\{w, t, Q, A, I(Q), S\}$ during step 250 (e.g., the server updates the threshold t or the user's set of questions Q or the user's contextual information I(Q) or the user's additional state information S or any combination of the above).

An exemplary SA-KBA response handling process 800 is discussed further below in conjunction with FIG. 8.

Exemplary SA-KBA Methods

History-Aware Questionnaires

Figure 3:
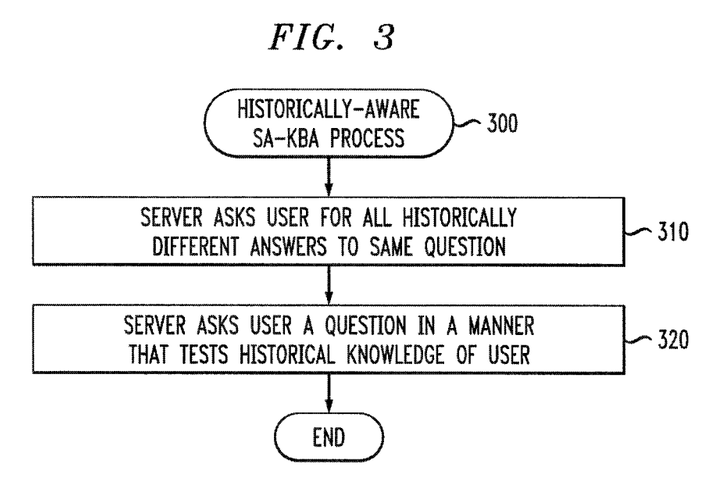
FIG. 3 is a flow chart describing an exemplary historically-aware SA-KBA process.

FIG. 3 is a flow chart describing an exemplary historically-aware SA-KBA process 300. As shown in FIG. 3, during the setup phase, the server asks the user during step 310 for all historically different answers to the same question or for history-aware answers to a set of inter-related but different questions. As used herein, a "history-aware answer" comprises an answer to a given question that is accurate for an indicated date or period of time. In this manner, by providing historically different answers to the same question or history-aware answers to a set of inter-related questions, the user demonstrates with high confidence that the user has global knowledge of multiple related events that occur over a period of time or simultaneously in time.

For instance, it asks for all different states that a user has lived, where answers are given in chronological order and with placements in time, e.g., from 1968 to 1994 in MA, from 1994 to 1999 in CA and from 1999 until present in TX. Then, during the challenge phase, the server asks the user during step 320 the question in a manner that tests the historical knowledge of the user with respect to temporal or geo-temporal aspects, such as the current state of the user, the exact ordering in time of certain events, the exact correlation of user's past activities across time and geolocation. For example, In the question "State of your current house?" any answer other than TX will increase the fraudulent score of the user. The higher the temporal discrepancy, the higher the score.

In the question "State you watched the 1992 Olympic games in Barcelona?" any answer other than MA will increase the fraudulent score of the user. The higher the temporal discrepancy, the higher the score.

In this manner, an attacker who makes use of sporadic/opportunistic on-line data will be less likely able to recreate the complete geo-temporal history of the residencies of a victim.

Intentional-Failure Questionnaires

Figure 4:
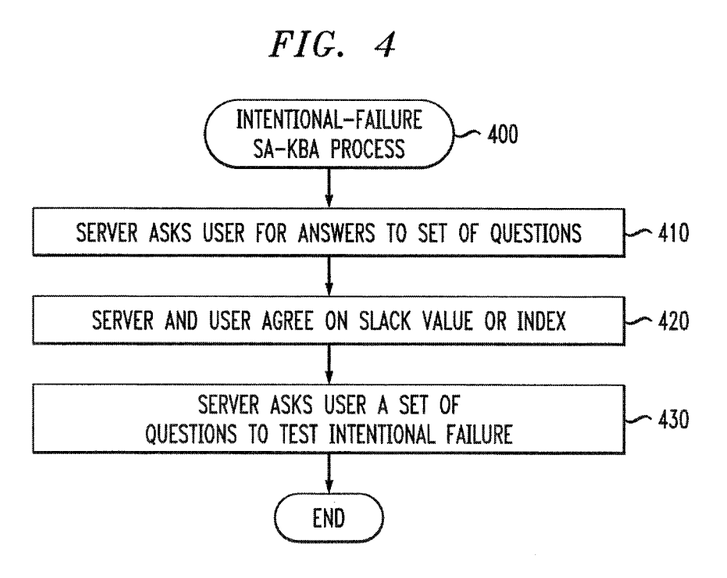
FIG. 4 is a flow chart describing an exemplary intentional-failure SA-KBA process.

FIG. 4 is a flow chart describing an exemplary intentional-failure SA-KBA process 400. Generally, the user is supposed to answer a particular question in a set of questions incorrectly in a way that is encoded by the answer to another question or some preset secret "slack" value. For instance, assume that the user chooses (or is assigned by the server) a slack value of 3. This value can be used to create discrepancies in the answers provided by the user that are predictable by the server but unpredictable by the attacker.

As shown in FIG. 4, during step 410, the server initially asks the user for answers to a set of questions. In addition, in one exemplary embodiment, the user and server agree during step 420 on a particular slack value, such as a slack value of 3, or an answer index, as discussed below.

Then, during the challenge phase, the server asks the user a set of questions during step 430 in a manner that tests whether the user intentionally fails a particular question. For example, in a series of k>3 questions, the user is supposed to incorrectly respond to question number 3.

In a history-aware type of question that is appropriately defined in the setup phase, the user is supposed to answer with the 3rd order answer (e.g., 3rd order state of residence). Thus, during the challenge, the server asks the user a set of questions during step 430 in a manner that tests the users knowledge of the predefined answer index that is required in addition to the necessary knowledge to answer the question (e.g., 3rd order state of residence).

Fictitious Questionnaires

Figure 5:
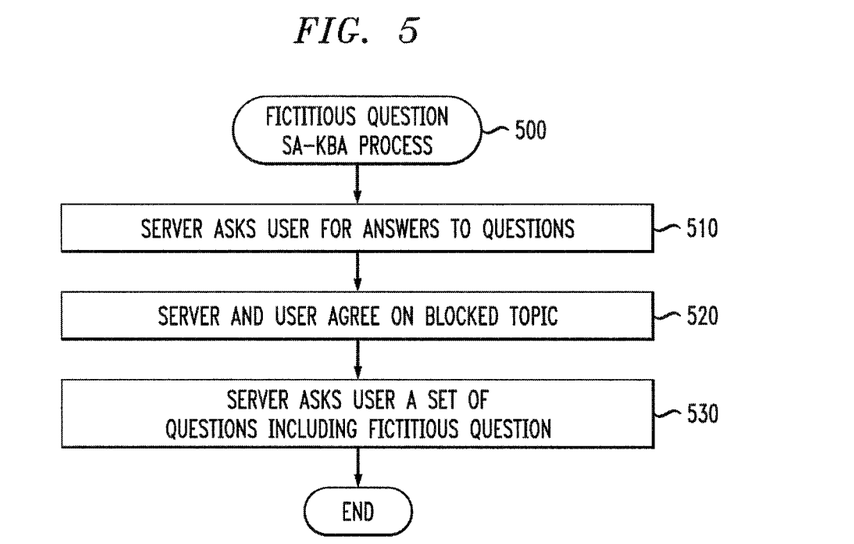
FIG. 5 is a flow chart describing an exemplary fictitious question SA-KBA process.

FIG. 5 is a flow chart describing an exemplary fictitious question SA-KBA process 500. Generally, the server and user agree on a blocked topic that the user should never answer at all, based on a preset secret "poison" pattern. For example, the user is set up so that he or she never answers questions that are related to preference or names. Again, fictitious questions can be specific to history-aware context, e.g., one is not supposed to ever answer about his or her first (oldest) state residence.

As shown in FIG. 5, during step 510, the server initially asks the user for answers to one or more questions. In addition, in one exemplary embodiment, the user and server agree during step 520 to a predefined blocked topic that the user should never answer about. Then, during the challenge phase, the server asks the user a set of questions during step 530 that includes at least one fictitious question. If the user answers a question that addresses a blocked topic, the server can detect a fraudulent access attempt.

Multiplexing Questionnaires

Figure 6:
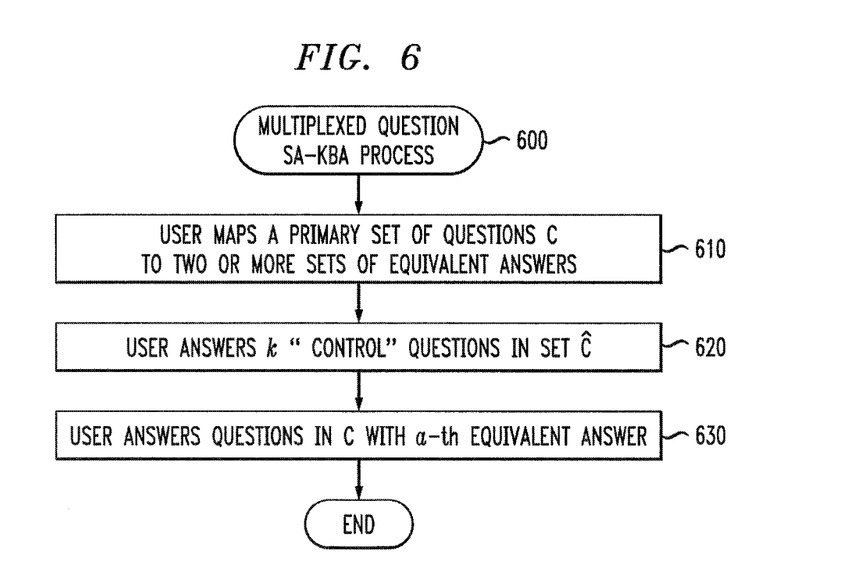
FIG. 6 is a flow chart describing an exemplary multiplexed question SA-KBA process.

FIG. 6 is a flow chart describing an exemplary multiplexed question SA-KBA process 600. Generally, during the setup phase, the user maps a primary set of questions C to two or more sets of equivalent answers $A_1(C), A_2(C), \ldots A_l(X)$ during step 610. Each question in a primary set of questions C is thus mapped to l equivalent answers, where the equivalent answers are referred to as the information set of size l for questions C.

Then, during the challenge phase, on challenge ($\hat{C}$, C), where $\hat{C}$=k≥2 and where C has an answer information set of size l=$2^k$, the user first answers k "control" questions in set $\hat{C}$ during step 620, which consists of k yes/no questions, i.e., each question in C admits a "yes" or a "no" as an answer. Let a=($a_1,a_2,\ldots,a_k$) be the k-bit string that represents the yes/no answers given by the user, where $a_i$=1 if and only if the answer to the corresponding i-th question in $\hat{C}$ is "yes." In other words, the answer a=($a_1, a_2, \ldots, a_k$) to the set of control questions provides an index to which of the l equivalent answers should be provided to the primary question(s). Thus, during step 630, the user is supposed to answer the questions in C with the a-th equivalent answer in the information set of size l for questions in C. Here, it is assumed that this information set is ordered according to some ordering so that the equivalent answer of rank a is well defined.

For example, if l=4, there are 4 possible equivalent answers. If the user is supposed to provide the second equivalent answer (corresponding to a binary value of 1 0), then the user is challenged with two control questions having answers of yes and no, respectively. The answers to the control questions provides an indication to the user to provide the second equivalent answer.

If the user answers a question with a different equivalent answer than the equivalent answer indexed by the answer to the control questions, the server can detect a fraudulent access attempt.

Query-Based Questionnaires

Figure 7:
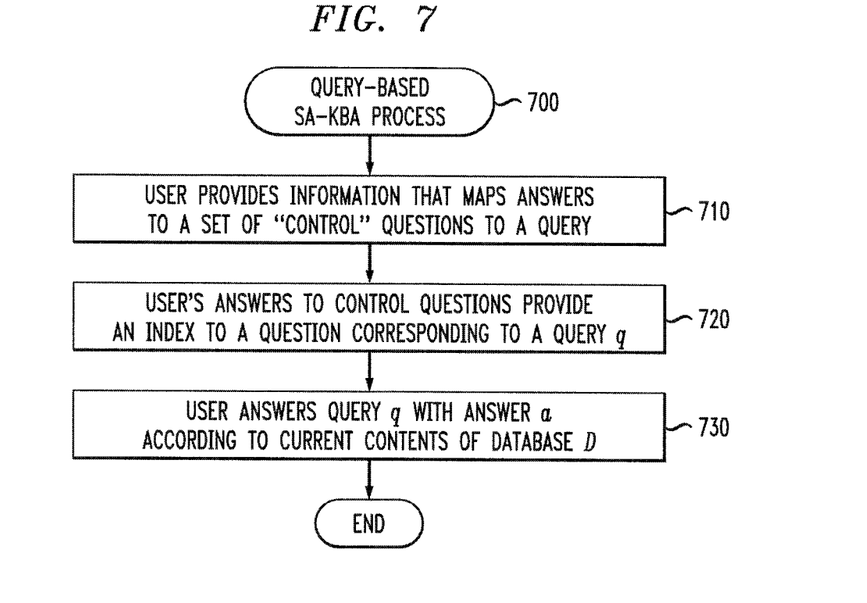
FIG. 7 is a flow chart describing an exemplary query-based SA-KBA process.

FIG. 7 is a flow chart describing an exemplary query-based SA-KBA process 700. Generally, the answers to control questions provide an index into a list of queries that can be answered in a database D containing information that is personal to the user. In other words, the answers to the control questions determine the particular query question that is answered in the user database D. In this manner, the query is determined dynamically or "on the fly" and provides protection against an attacker.

Thus, the user answers to a challenge by providing secret information that corresponds to the answer a to a query q on its personal-record database D kept by the server.

In the setup phase, the user provides information during step 710 that is used to map the answers to a set of yes/no "control" questions to a query on the user's personal-record database that the server has access to. Then, in the challenge phase, the user is challenged during step 720 with a series of such control questions followed by a question that corresponds to a query q on the user's database D. This challenge query q in step 720 is the query to which the answers to the control questions are mapped according to the mapping of the setup phase. The user has to answer this challenge query q during step 730 with the exact answer a to q according to the current contents of his/her personal database D.

For instance, consider a laptop that has been lost and an attacker attempts accessing the contents of the hard drive. In this case the system (i.e., the server in our model) may ask KBA type of questions to the attacker as follows. The contents of the hard drive is viewed as a database and the attacker is challenged with a query q that depends on information initially provided by the legitimate user and perhaps by previous challenge KBA questions answered by the attacker. Then the KBA answer provided by the attacker should be consistent with this exact answer a that corresponds to query q.

Fraud-Remediation Methods

The exemplary silent-alarm general approach described herein aims to distinguish between three classes of authentication attempts:

1. Legitimate authentication attempt is performed by legitimate user who provides correct, authentic credentials;
2. Non-legitimate authentication attempt is performed by impersonator who guesses answers based on data-mining techniques;
3. Non-legitimate authentication attempt is performed by attacker who performs a dictionary attack.

Figure 8:
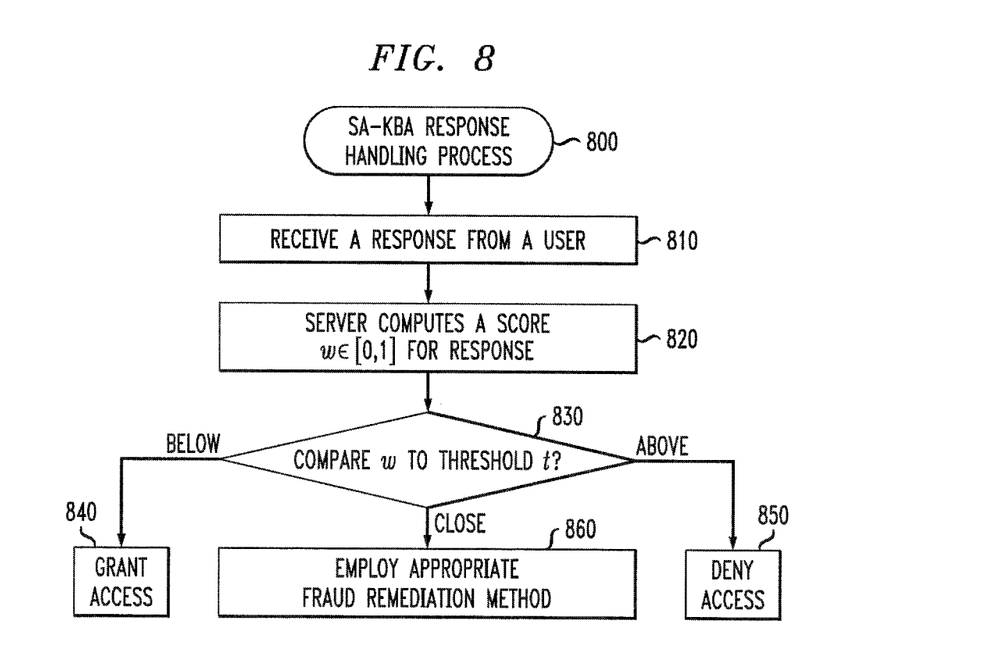
FIG. 8 illustrates an exemplary SA-KBA response handling process incorporating aspects of the present invention.

FIG. 8 illustrates an exemplary SA-KBA response handling process 800 incorporating aspects of the present invention. Generally, the exemplary SA-KBA response handling process 800 classifies the three exemplary classes of authentication attempts as follows. As shown in FIG. 8, the exemplary SA-KBA response handling process 800 initially receives a response from a user during step 810. The exemplary SA-KBA response handling process 800 computes the corresponding score w during step 820, as discussed above.

A test is performed during step 830, to compare the score w to the threshold t. If it is determined during step 830 that the score w is below the threshold t, then the response is believed to be associated with a legitimate authentication attempt. The associated score W assigned to the current authentication attempt is low (actually, it is far lower than the threshold t) and therefore access is granted during step 840 (perhaps with some post-authentication update of the user's state that is kept by the server according to our new silent-alarm and score-based KBA method).

If it is determined during step 830 that the score w is above the threshold t, then the response is believed to be associated with a dictionary attack. The associated score w is high (actually, it is typically far higher than the threshold t) and therefore access is denied during step 850.

If, however, it is determined during step 830 that the score w is close to the threshold t (e.g., w is within a predefined tolerance of the threshold), then the access is believed to be a non-legitimate authentication attempt by impersonator guessing answers based on data-mining techniques. It is unclear how to best react to an authentication attempt that with some confidence falls into the second category above. In this case, the associated score W assigned to the current authentication attempt may be close to the threshold t, which provides high-confidence evidence that the authentication attempt must be treated with care as it may correspond to an impersonation attack. Ideally, the server should react in such a way that handles an authentication attack in the best possible way according to the specific impersonation attempt that has been detected.

An appropriate fraud remediation method is applied during step 860, as discussed below. Four exemplary fraud remediation methods are described hereinafter for fraud attempts that are detected through the usage of silent alarms and that are labelled as "data-mining" fraud attacks:

A "conservative response" can employ access denial and event sharing. With this conservative method, the server conservatively denies the transaction, logs this denied attempt and passes this evidence to the appropriate intrusion-detection system or to the personnel of a Security Operation Center.

An "intelligent response" can employ plausible-data categorization. With this intelligent method, the server differentiates its behavior according to whether the received responses are plausible as opposed to being correct. Plausible data refers to data that is thematically close to the correct data but does not exactly overlap with correct data, and it is considered as the result of a non-legitimate authentication attempt by an attacker who has previously used data-mining techniques for collecting information about a target victim user. A distance metric is defined over the space of all possible answers and the server performs a taxonomy of different types of answers. The distance metric is used to label answers as plausible but not accurate (correct). For example, consider the case where an attacker mines that a specific user is interested in sports; therefore the attacker uses some guessed sport value or same stale (previously but not currently valid) value as the favorite sport of the user. Then, the server does not simply deny access but also calculates the distance between the actual answer and the received answer to appropriately label this failed authentication attempt. Based on this labeling, the server acts appropriately: if the answer is accurate, access is granted, otherwise access is denied but with a "data-mining" label. Note that this technique can be combined with the silent-alarm scoring technique to add another layer of intelligence around the detection of fraudulent authentication attempts.

An "aggressive response" can employ further interrogation. With this aggressive method, the server asks further questions of the user in order to collect useful information about the source of a breach.

A "stealthy response" can employ honeypot usage. With this stealthy method, the server mimics normal behavior (i.e., in particular, the server gives access to the user but in a possibly restricted but stealthy way) and continues with data collection and further investigation so that more evidence about the attacker is gathered until eventually the attacker's identity is fully revealed.

Silent-Alarm Knowledge-Based Authentication (SA-KBA) System

Figure 9:
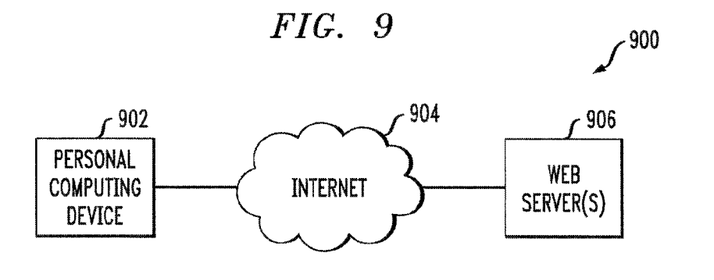
FIG. 9 illlustrates an exemplary silent-alarm knowledge-based authentication system in accordance with the present invention.

FIG. 9 illlustrates an exemplary silent-alarm knowledge-based authentication system 900 in accordance with the present invention. As shown in FIG. 9, the exemplary silent-alarm knowledge-based authentication system 900 comprises a personal computing device 902, a network 904, and one or more web servers 906. The personal computing device 902 may be, for example, a desktop, laptop or palmtop PC, a mobile telephone, a personal digital assistant (PDA), a wireless email device, a workstation, a kiosk, a television set-top box, a game console, or any other information processing device configured to support silent-alarm knowledge-based user authentication as described herein. A given server 906 may be implemented as a computer or other stand-alone processing platform, or may be distributed over multiple processing platforms comprising multiple separate computers. Numerous other arrangements of one or more servers are possible in the silent-alarm knowledge-based authentication system 900. The personal computing device 902 and the server(s) 906 are examples of what are more generally referred to herein as "processing devices."

The personal computing device 902 will generally include a user interface through which an associated user can interact with the system. This interaction allows the user to authenticate to the system so as to obtain access to a protected resource without requiring the user to present a predetermined credential such as an established PIN or a password from a particular authentication token.

The protected resource may be designated functionality of the personal computing device itself. In such an arrangement, the user is able to access the interface in order to attempt to authenticate but is not granted access to any other functionality of the personal computing device until such time as the user is authenticated. An important advantage of an arrangement of this type is that the personal computing device need not have network connectivity at the time of the access request.

Alternatively, the protected resource may be a resource of the server(s) 906 or a resource accessible via the server(s) 906. In such an arrangement, the user interface of the personal computing device 902 may still be used to obtain user input as part of a process in which the user authenticates to the server(s).

The network 904, although illustratively shown as the Internet, may comprise, for example, a wide area network (WAN), a local area network (LAN), a satellite network, a telephone or cable network, or various portions or combinations of these and other types of networks.

The silent-alarm knowledge-based user authentication may be utilized to provide backup or emergency authentication in the event a user does not have his or her appropriate predetermined credential(s) readily available. Thus, any of a wide variety of conventional primary authentication processes may also be implemented using the system 900. These primary authentication processes may be utilized when the user is in possession of his or her appropriate predetermined credential(s). Such primary authentication processes are well known to those skilled in the art. Alternatively, the silent-alarm knowledge-based user authentication may itself serve as a primary authentication process in the system, or as an adjunct authentication process intended to enhance the security of one or more existing authentication processes.

It is to be appreciated that a given embodiment of the system 100 may include multiple instances of personal computing device 902, network 904 and server set 906, although only single instances of such components are shown in the simplified system diagram for clarity of illustration. For example, a given user may have multiple personal computing devices that access different sets of servers over different networks.

Figure 10:
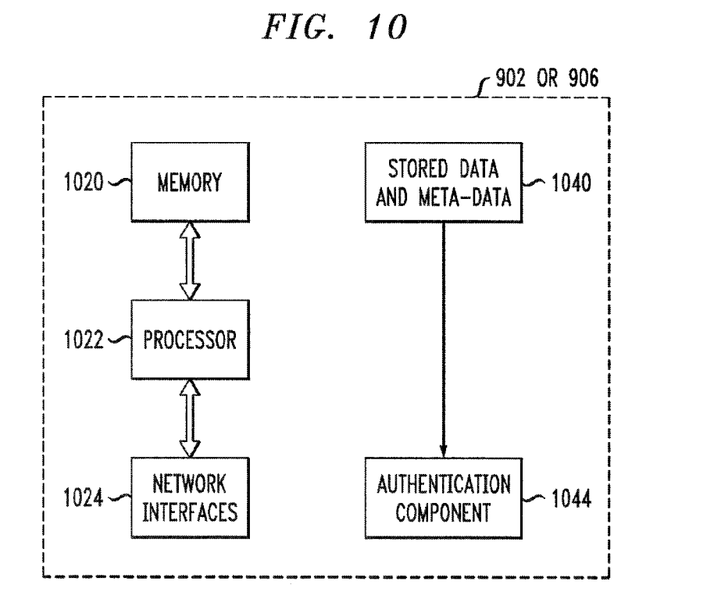
FIG. 10 shows a more detailed view of one possible implementation of a personal computing device or server of the FIG. 9 system.

Referring now to FIG. 10, a more detailed illustrative implementation of a processing device of the system 900 is shown. The processing device shown may be viewed as representing personal computing device 902 or a given server 906. The processing device 902 or 906 comprises a memory 1020 coupled to a processor 1022. The processor 1022 is also coupled to interface circuitry comprising network interfaces 1024. A given such network interface is utilized for communicating in a conventional manner with the network 904.

The various elements 1020, 1022 and 1024 of FIG. 10 may be implemented in whole or in part as a conventional microprocessor, microcontroller, digital signal processor, application-specific integrated circuit (ASIC) or other type of circuitry, as well as portions or combinations of such circuitry elements. As will be appreciated by those skilled in the art, portions of a dynamic knowledge-based user authentication process in accordance with an embodiment of the invention can be implemented at least in part in the form of one or more software programs that are stored at least in part in memory 1020 and executed by processor 1022.

Also included in processing device 902 or 906 as shown in FIG. 10 are a number of additional elements, including stored information 1040 and an authentication component 1044. One or more of these elements may be implemented at least in part in the form of software that is stored in the memory 1020 and executed by the processor 1022. One skilled in the art would be readily able to implement such software given the teachings provided herein. The memory 1020 is an example of what is more generally referred to herein as a "processor-readable storage medium."

The processing device 902 or 906 is configured to support silent alarm knowledge-based user authentication utilizing elements 1040 and 1044, as discussed above in conjunction with FIGS. 2 through 8.

Generally, the stored information 1040 may comprise, for example, stored data and meta-data indicative of a manner in which the user had utilized the protected resource during one or more previous authenticated accesses to the protected resource. The meta-data may be used to determine previous access times for files and other information elements of the protected resource. It is important to note that the stored information 1040 will typically comprise information that is already present in the processing device, such as stored files and associated meta-data. Such information is stored in the ordinary course of operation of the processing device, and may be used as a basis for user authentication as described herein.

In a given embodiment, the stored information 1040 is entirely within the personal computing device 902. As mentioned above, this is a particularly advantageous arrangement in that the personal computing device need not have network connectivity at the time of the access attempt.

The authentication component 1044 receives input from the user regarding one or more characteristics of the stored information 1040. For example, the authentication component 1044 may formulate a number of questions based on the characteristic(s). The authentication component 1044 grants or denies access to the protected resource based at least in part on the input received from the user, as discussed above in conjunction with FIG. 8.

CONCLUSION

As previously indicated, the above-described embodiments of the invention are presented by way of illustrative example only. Numerous variations and other alternative embodiments may be used, as noted above.

The present invention provides methods and apparatus for implementing silent-alarm knowledge-based authentication. The disclosed silent-alarm knowledge-based authentication methods and system, for example, can provide an alarm indicator when an attacker attempts to impersonate a user.

Additional details regarding certain conventional cryptographic techniques referred to herein may be found in, e.g., A. J. Menezes et al., Handbook of Applied Cryptography, CRC Press, 1997, which is incorporated by reference herein.

The illustrative embodiments of the invention as described herein provide silent-alarm knowledge-based authentication. Advantageously, the illustrative embodiments do not require changes to existing communication protocols. It is therefore transparent to both existing applications and communication protocols.

It should again be emphasized that the particular authentication and communication techniques described above are provided by way of illustration, and should not be construed as limiting the present invention to any specific embodiment or group of embodiments. For example, as previously noted, the described embodiments may be adapted in a straightforward manner to operate with other types of credentials or authentication information. Also, the particular configuration of system elements, and their interactions, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A knowledge-based authentication method performed by a server for restricting access of a user to a restricted resource, comprising the steps of:
    obtaining a plurality of historically different answers from said user for each of at least one question during a registration phase with said user, wherein said plurality of historically different answers for a given question are different for at least two different periods of time;
    challenging said user with at least one question that tests the historical knowledge of said user within said historically different answers to said given question for a given period of time;
    receiving a response from said user to said at least one question; and
    granting access to said restricted resource if said response is accurate for said given period of time based on said historically different answers, wherein at least one of said steps are performed by at least one hardware device.

2. The method of claim 1, wherein said historically different answers comprise answers with applicable dates.

3. The method of claim 1, wherein said historically different answers comprise a series of correct answers to said question over time.

4. The method of claim 1, wherein said historically different answers comprise a series over time of one or more of facts, traits and characteristics of said user.

5. The method of claim 1, further comprising the step of determining a confidence score based on said accuracy of said response for said given period of time based on said historically different answers.

6. The method of claim 5, wherein said confidence score assesses a credibility of said user.

7. The method of claim 5, wherein said confidence score is evaluated relative to a threshold.

8. The method of claim 7, further comprising the step of employing a fraud remediation method when said confidence score is within a predefined tolerance of said threshold.

9. The method of claim 8, wherein said fraud remediation method comprises one or more of denying access and sending a notification of said access attempt.

10. The method of claim 8, wherein said fraud remediation method comprises classifying said response as plausible or correct.

11. The method of claim 10, further comprising the steps of calculating a distance between an actual answer and a received answer and labeling a plausible response as a data mining access attempt.

12. The method of claim 8, wherein said fraud remediation method comprises further interrogation of said user.

13. The method of claim 8, wherein said fraud remediation method comprises granting access to said user and investigating said user to determine an identity of said user.

14. The method of claim 1, wherein an accurate response demonstrates with measurable confidence that said user has global knowledge of multiple related events.

15. A knowledge-based authentication method performed by a server for restricting access of a user to a restricted resource, comprising the steps of:
    obtaining a plurality of historically aware answers from said user to a set of inter-related questions during a registration phase with said user, wherein each of said historically aware answers comprises an answer to a given question that is accurate for an indicated period of time;

challenging said user with one or more of said inter-related questions for a given period of time;

receiving a response from said user to said one or more inter-related questions; and granting access to said restricted resource if said response is accurate for said given period of time based on said historically aware answers, wherein at least one of said steps are performed by at least one hardware device.

16. The method of claim 15, further comprising the step of determining a confidence score based on said accuracy of said response for said given period of time based on said historically aware answers.

17. The method of claim 16, wherein said confidence score assesses a credibility of said user.

18. The method of claim 15, wherein said confidence score is evaluated relative to a threshold.

19. The method of claim 18, further comprising the step of employing a fraud remediation method when said confidence score is within a predefined tolerance of said threshold.

20. The method of claim 19, wherein said fraud remediation method comprises one or more of denying access and sending a notification of said access attempt.

21. The method of claim 19, wherein said fraud remediation method comprises classifying said response as plausible or correct.

22. The method of claim 21, further comprising the steps of calculating a distance between an actual answer and a received answer and labeling a plausible response as a data mining access attempt.

23. The method of claim 19, wherein said fraud remediation method comprises further interrogation of said user.

24. The method of claim 19, wherein said fraud remediation method comprises granting access to said user and investigating said user to determine an identity of said user.

25. The method of claim 19, wherein an accurate response demonstrates with measurable confidence that said user has global knowledge of multiple related events.

26. A knowledge-based authentication server for restricting access of a user to a restricted resource, comprising:
a memory; and
at least one hardware device, coupled to the memory, operative to implement the following steps:
obtaining a plurality of historically different answers from said user for each of at least one question during a registration phase with said user, wherein said plurality of historically different answers for a given question are different for at least two different periods of time;
challenging said user with at least one question that tests the historical knowledge of said user within said historically different answers to said given question for a given period of time;
receiving a response from said user to said at least one question; and
granting access to said restricted resource if said response is accurate for said given period of time based on said historically different answers.

27. The server of claim 26, wherein said historically different answers comprise answers with applicable dates.

28. The server of claim 26, wherein said historically different answers comprise a series of correct answers to said question over time.

29. The server of claim 26, wherein said historically different answers comprise a series over time of one or more of facts, traits and characteristics of said user.

30. The server of claim 26, further comprising the step of determining a confidence score based on said accuracy of said response for said given period of time based on said historically different answers.

31. The server of claim 30, wherein said confidence score assesses a credibility of said user.

32. The server of claim 30, wherein said confidence score is evaluated relative to a threshold.

33. The server of claim 32, further comprising the step of employing a fraud remediation server when said confidence score is within a predefined tolerance of said threshold.

34. An article of manufacture for knowledge-based authentication by a server for restricting access of a user to a restricted resource, comprising a non-transitory machine readable recordable medium containing one or more programs which when executed implement the steps of:
obtaining a plurality of historically different answers from said user for each of at least one question during a registration phase with said user, wherein said plurality of historically different answers for a given question are different for at least two different periods of time;
challenging said user with at least one question that tests the historical knowledge of said user within said historically different answers to said given question for a given period of time;
receiving a response from said user to said at least one question; and
granting access to said restricted resource if said response is accurate for said given period of time based on said historically different answers.

35. A knowledge-based authentication server for restricting access of a user to a restricted resource, comprising:
a memory; and
at least one hardware device, coupled to the memory, operative to implement the following steps:
obtaining a plurality of historically aware answers from said user to a set of inter-related questions during a registration phase with said user, wherein each of said historically aware answers comprises an answer to a given question that is accurate for an indicated period of time;
challenging said user with one or more of said inter-related questions for a given period of time;
receiving a response from said user to said one or more inter-related questions; and
granting access to said restricted resource if said response is accurate for said given period of time based on said historically aware answers.

36. The server of claim 35, wherein said at least one hardware device is further configured to determine a confidence score based on said accuracy of said response for said given period of time based on said historically aware answers.

37. The server of claim 36, wherein said confidence score assesses a credibility of said user.

38. The server of claim 35, wherein said confidence score is evaluated relative to a threshold.

39. The server of claim 38, further comprising the step of employing a fraud remediation server when said confidence score is within a predefined tolerance of said threshold.

40. The server of claim 38, wherein an accurate response demonstrates with measurable confidence that said user has global knowledge of multiple related events.

41. An article of manufacture for knowledge-based authentication by a server for restricting access of a user to a restricted resource, comprising a non-transitory machine readable recordable medium containing one or more programs which when executed implement the steps of:

obtaining a plurality of historically aware answers from said user to a set of inter-related questions during a registration phase with said user, wherein each of said historically aware answers comprises an answer to a given question that is accurate for an indicated period of time;

challenging said user with one or more of said inter-related questions for a given period of time;

receiving a response from said user to said one or more inter-related questions; and granting access to said restricted resource if said response is accurate for said given period of time based on said historically aware answers.

\* \* \* \* \*